Dec. 19, 1944.  C. L. EKSERGIAN ET AL  2,365,460
BRAKE MECHANISM
Filed March 19, 1942  2 Sheets-Sheet 1

INVENTORS
Carolus L. Eksergian and
Paul W. Gaenssle
BY John P. Tarbox
ATTORNEY

Dec. 19, 1944.   C. L. EKSERGIAN ET AL   2,365,460
BRAKE MECHANISM
Filed March 19, 1942        2 Sheets-Sheet 2
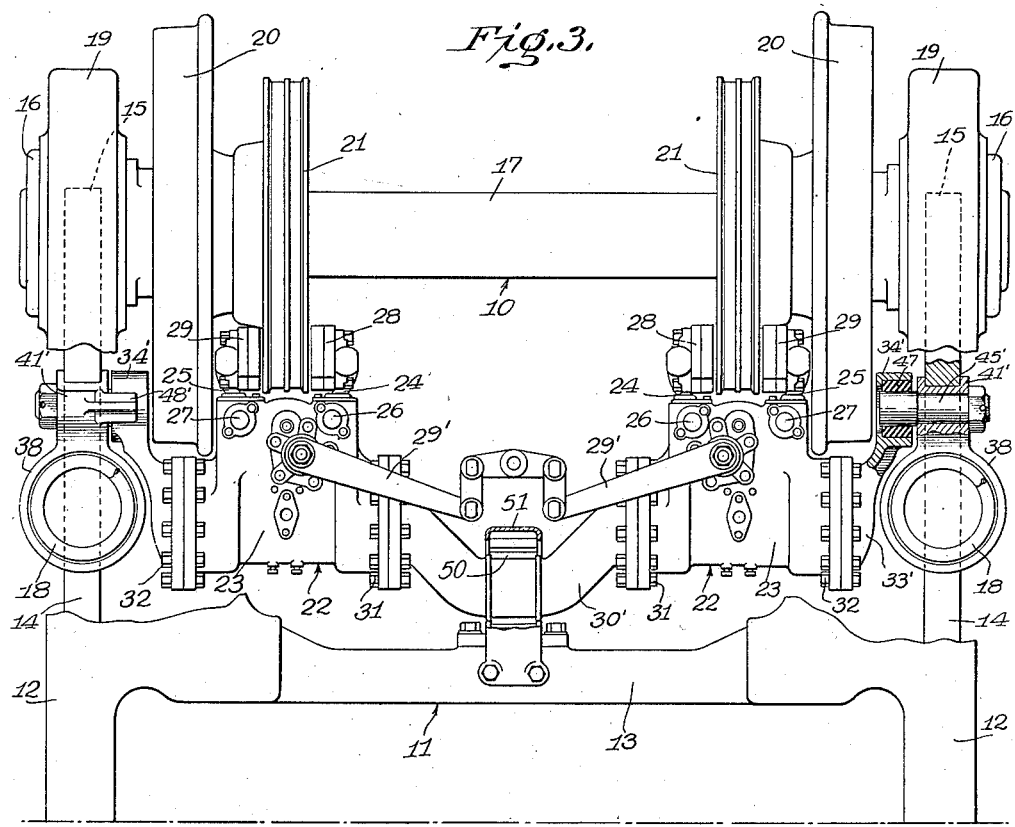
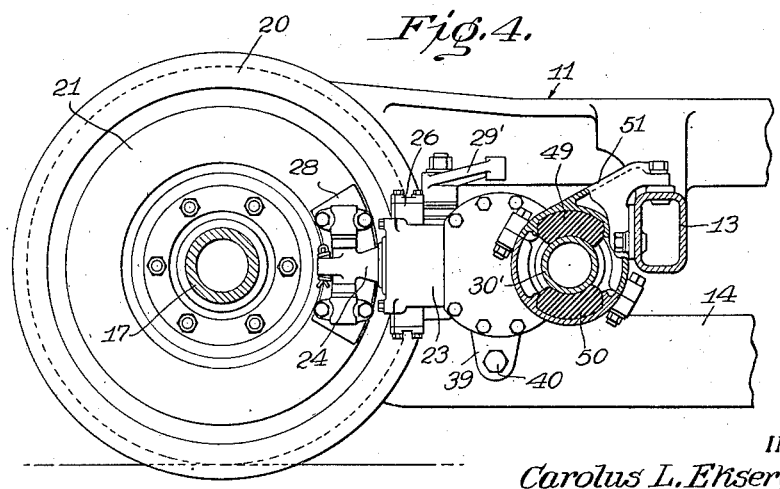
INVENTORS
Carolus L. Eksergian and
Paul W. Gaenssle
BY  John P. Darby
ATTORNEY Patented Dec. 19, 1944

2,365,460

UNITED STATES PATENT OFFICE 2,365,460

BRAKE MECHANISM

Carolus L. Eksergian and Paul W. Gaenssle, Detroit, Mich., assignors to Budd Wheel Company, Philadelphia, Pa., a corporation of Pennsylvania Application March 19, 1942, Serial No. 435,278

9 Claims. (Cl. 188—59)

The invention relates to brake mechanisms and particularly to such mechanisms associated with a railway truck of the type having longitudinally extending side frame members supported from the ends of the wheel and axle assembly.

It is among the objects of the invention to simplify the support of the brake mechanism from the truck and to provide a flexible connection between the ends of the support and the longitudinal members of the truck which permits relative vertical movements and tilting of the frame members on opposite sides of the truck without imposing appreciable stresses onto the brake support. It is a further object to provide a brake support which permits of readily assembling and disassembling most of the brake mechanism from the truck without disturbing the connection to the side frame members.

These objects are attained in large measure by mounting the brake shoes and the actuating means therefor on a transverse member extending between and flexibly supported from the longitudinal side members of the truck frame and more particularly from the equalizer bars carried directly from the ends of the axles. According to one form of the invention, the brake support and its associated parts is carried wholly from the equalizer bars. According to another form it is carried to a large extent from the equalizer bars and, additionally, by a third point of support from the truck frame at a point longitudinally remote from its connection to the equalizer bars. Simplification of the truck and brake organization is further attained by associating the pivotal connection of the brake support with the spring seating brackets ordinarily associated with the equalizer bars, and this is accomplished by forming the spring seating brackets with a longitudinal extension or extensions, which extensions are well adapted to receive horizontal pivot pins through which the ends of the brake support are yieldingly supported. Preferably this yielding support comprises a rubber sleeve interposed between the pivot pin and a socket in the end of the brake support.

To permit of ready removal and replacement of the major portion of the brake support and the parts carried thereby without disturbing the connection to the side frames or equalizer bars, the end portions of the brake support are made as separate members which can be readily bolted or otherwise removably secured to the portion of the brake support extending between them.

Other and further objects and advantages and the manner and means by which they may be attained will become evident from the following detailed description when read in connection with the accompanying drawings forming a part of this specification.

In the drawings:

Fig. 3 is a view similar to Fig. 1 showing a slight modification of the brake support, and Fig. 4 is a central vertical longitudinal sectional view of the form of the invention shown in Fig. 3.

Figure 1:
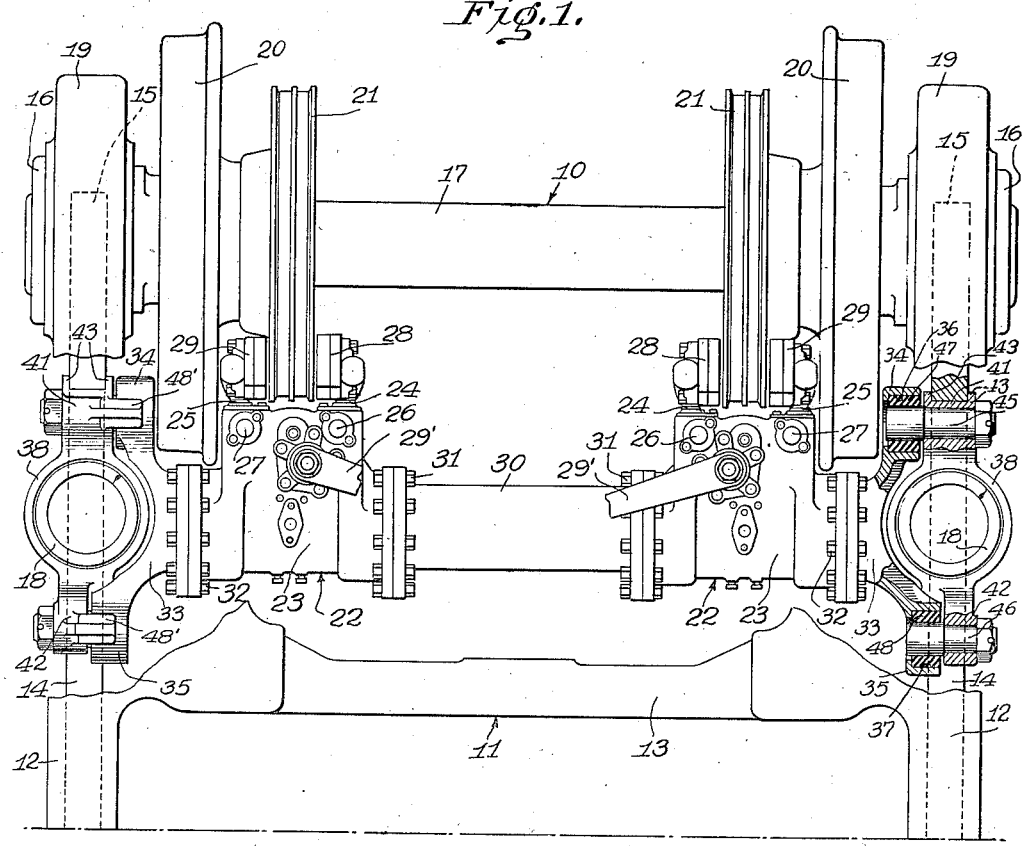
Fig. 1 is a plan view of one end of a truck equipped with the invention, parts in this view being broken away and shown in section.

The truck to which the invention is shown applied may comprise a pair of longitudinally spaced wheel and axle assemblies, as 10, located adjacent the opposite ends of the truck and a frame 11, including longitudinal side members 12 interconnected by cross members, as 13, which is supported from the wheel and axle assemblies through equalizer bars 14 having their ends offset upwardly at 15 and resting on the axle boxes 16 adjacent the ends of the axle 17. The frame 11 is resiliently supported from the equalizer bars by springs, as 18, and is guided by the pedestal guides 19 for relative vertical movement with respect to the axle boxes 16.

Each of the wheels, as 20, of the wheel and axle assembly has associated therewith, so as to rotate with the wheel, a brake ring, as 21, each of the brake rings having radial braking faces on its opposite sides for engagement by suitable non-rotatable brake members.

For convenience of assembly and disassembly, the non-rotary brake members associated with each brake disc may be sub-assembled as separate brake cylinder units, designated generally by the reference character 22. These units 22 may be entirely similar to the units fully described and claimed in applicants' co-pending application Serial No. 399,779, filed June 26, 1941, and will not here be described in detail. Suffice it to say, that each unit comprises a casing 23 housing a brake cylinder which operates upon a pair of levers 24, 25 pivoted at 26 and 27, respectively, within the casing 23 and carrying at the outer ends brake shoes 28 and 29 disposed on opposite sides of the disc 21 in cooperative relation with the radial braking face on its opposite sides. Manual means for operating the brakes are provided by the levers 29', one associated with each unit 22 and connected for simultaneous equalized operation, as indicated in Fig. 3, by links and an equalizing bar, all as fully described in the hereinbefore referred to copending application.

Figure 2:
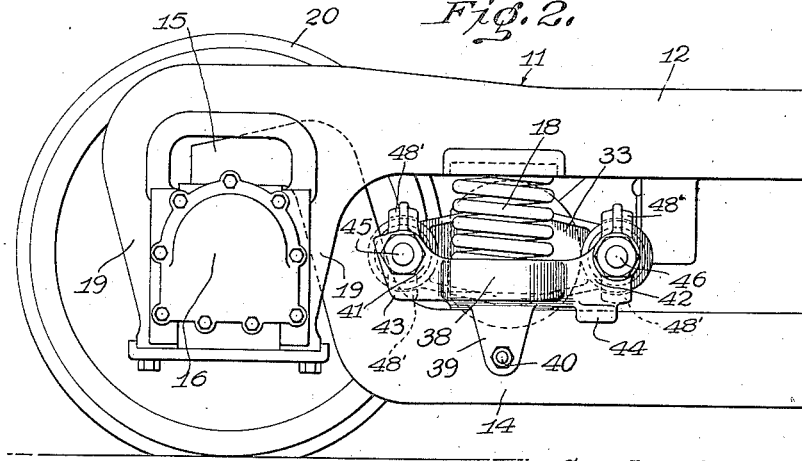
Fig. 2 is a side elevation of the truck end shown in Fig. 1.

In the form of the invention shown in Figs. 1 and 2, these brake cylinder units 22 disposed in cooperative relation with the respective discs 21 are joined together by a rectilinear intermediate member 30 bolted at 31 to the inner ends of the brake cylinder units. At the outer ends the brake cylinder units are removably secured, as by the bolts 32, to end extensions 33 which together with the cylinder units 22 and connecting member 30 form the brake support and which are connected to the equalizer bars in the manner now to be described. Since each of the end extensions is similarly connected, only one need be described.

Each end extension 33 has longitudinally extending arms designated 34 and 35 and each of these arms is provided with sockets designated, respectively, 36 and 37.

The spring seat bracket 38 is associated in the usual way with the equalizer bar 14 by being seated on top of it and having downward extensions 39 overlapping the opposite sides of the equalizer bar and secured to it by a through bolt 40. To provide for the attachment of the brake support to the equalizer bar, each bracket 38 is provided with longitudinal extensions 41 and 42, these extensions being located in fixed transverse relation with respect to the equalizer bar by flanges, as 43 and 44, respectively, overlapping the sides of the equalizer bar, as clearly appears in Fig. 1.

The extensions 41 and 42 have transverse, generally horizontal, openings therein receiving the pivot bolts 45 and 46 being clamped in position by having their inner enlarged ends drawn against the inner side of the extensions 41 and 42 by the nuts screwed upon the outer ends of the bolts. The inner enlarged ends of the bolts 45 and 46 project, respectively, into the sockets 36 and 37 and to permit yieldability between the brake support and the mounting upon the equalizer bars, resilient annuli, such as rubber, and designated, respectively, 47 and 48, are interposed between the respective pins and their sockets. To prevent excessive compression of the rubber, rigid stop abutments, as 48', may be provided on the projections 41 and 42, these abutments extending inwardly above and below the arms 34 and 35 in suitably spaced relation thereto.

It will be seen that such a connection between the brake support 33, 22, 30, 22, 33 and the equalizer bars necessitates no change in the construction of the equalizer bars themselves. It requires only a modification of the spring seating brackets 38. If further, by reason of the longitudinally spaced arrangement of the pins and sockets connecting the brake support to the equalizer bars, avoids the necessity of providing a separate support from some other part of the frame to take the braking torque.

In other words, the longitudinally spaced pins and sockets with the rubber bushings interposed between respective pins and sockets may be said to provide extended flexible joints between the brake support and the equalizers. These joints, by reason of their extent or spread counteract substantially wholly the braking torque developed in the support per se and tending to turn it on its axis. Such braking torque is developed in the support by reason of the fact that the brake shoes are nearer the axle of the adjacent wheel and axle assembly than the joints through which the supporting structure is carried from the equalizers.

The rubber bushings or annuli in the connections permit the necessary relative vertical movement or tilting of the equalizer bars on the opposite sides of the truck without unduly straining the brake support. The brake support, in other words, has limited universal movement with respect to the equalizer bars.

The operation will now be briefly described. Assuming that the wheels, as shown in Fig. 2, are turning in counter-clockwise direction and the brakes are applied, the braking torque will then tend to rotate the brake support in clockwise direction, but this tendency is yieldingly resisted by the longitudinally spaced resilient connections between each end of the brake support and the equalizer bars. At all times, the yielding connection of the support to the equalizer bars will tend to cushion the shocks upon the support due to track irregularities. It will also be seen that, if due to track irregularities, one equalizer bar should rise vertically with respect to the other or should tilt with respect to the other, such slight deviation from normal would be cushioned by the resilient cushions which permit limited universal movement between the support and the bars. If it is desired to remove the central portion of the brake support 22, 30, 22 at any time, this can readily be done by removing the bolts 32 connecting it to the end members 33, and dropping it down to the tracks or lifting it out from between the side frames in an upward direction.

In the modification of Fig. 3, like parts are designated by like reference numerals. Referring to this construction, the end members 33' have but one longitudinal extension 34' and the spring seat bracket 38 has a corresponding extension 41'. This brake support is thus supported at each side by a single bolt 45' instead of by two longitudinally spaced bolts. The manner of support of the single bolt is similar to the manner of support shown in Fig. 1. This arrangement, however, does not prevent the brake support from swinging on the axis formed by the bolts 45'. It provides, however, a simplified form of spring seat bracket 38. To provide the additional support necessary to take the torque, according to this form of the invention, the central member 30' is formed with an offset resiliently carried between rubber blocks 49 and 50 clamped between it and a split bracket 51 bolted to the adjacent transverse member 13 of the top frame. This construction is entirely similar to that disclosed in the above-mentioned co-pending application and need not be further described in detail.

The operation of this modified form is substantially the same as that of the preferred form. The three-point resilient support permits the relative movements between the equalizer bar and the truck frame without imposing strains upon the support and it also cushions the shocks upon the support due to irregularities on the road. When the brakes are applied, assuming that the wheels, as shown in Fig. 4, are rotating counter-clockwise, the tendency of the support to turn in clockwise direction will be resisted, in this instance, by the upper rubber cushion 49.

In both forms it will be seen that the brake support is flexibly connected to the remainder of the truck frame and without any material modification of the truck frame. The only modification from the usual form of truck is the provision of the longitudinal extensions on the spring seat brackets for receiving the horizontal pivot pins. The present arrangement, in either of the forms shown, thus provides a very simple and compact support for the brake mechanism without adding materially to the weight of the truck frame and further avoids the use of large bearings extending around the axle box, as required in certain prior constructions.

While several preferred forms have been described in detail, it will be understood that changes and modifications may be made by those skilled in the art without departing from the spirit and scope of the claims appended hereto.

What is claimed is:

1. A brake mechanism for railway trucks comprising a wheel and axle assembly, a truck frame supported thereby including equalizer bars supported at the opposite ends of said wheel and axle assembly, a pair of brake rings rotatable one with each wheel of said assembly, and a brake support carrying brake shoes disposed in cooperative relation with said rings and actuating means for said shoes, said support being flexibly connected to the equalizer bars at the opposite sides of the truck adjacent the wheel and axle assembly through generally horizontally disposed pivotal connections, and having further support from the frame remote from said flexible connection.

2. A brake mechanism for railway trucks comprising a wheel and axle assembly, a truck frame supported thereby including equalizer bars directly supported at the opposite ends of said wheel and axle assembly, a pair of brake rings rotatable one with each wheel of said assembly, and a brake support carrying brake shoes disposed in cooperative relation with said rings and actuating means for the shoes, said support being connected to the equalizer bars by generally horizontally disposed pivotal connections adjacent the wheel and axle assembly, said connections allowing for limited universal movement between the support and bars and the support having further connection to the frame in a region remote from said pivotal connections.

3. A brake mechanism for railway trucks comprising a wheel and axle assembly, a truck frame having longitudinally extending side members supported at the opposite ends of the wheel and axle assembly through equalizers, a pair of brake discs one rotatable with each wheel of said assembly, and a unitary transversely extending brake supporting structure arranged at one side of said wheel and axle assembly and carrying brake shoes disposed in cooperative relation with said discs and actuating means for said shoes, said supporting structure being carried solely by, and connected at its ends to, said equalizers through extended flexible joints arranged to take the braking torque but to allow for limited universal movement between the supporting structure and the equalizers.

4. A brake mechanism for railway trucks having a wheel and axle assembly and longitudinally extending equalizers supported from the opposite ends of said wheel and axle assembly comprising brake discs rotatable one with each wheel of said wheel and axle assembly, and a unitary brake supporting structure arranged at one side of the wheel and axle assembly and carrying brake shoes disposed in cooperative relation with said discs and actuating means for the shoes, said brake supporting structure extending from equalizer to equalizer, being carried wholly by said equalizers and being flexibly connected through generally horizontally disposed flexible joint means of substantial longitudinal extent to the equalizers, whereby to take the braking torque and to allow for relative movements of said equalizers without stressing the supporting structure.

5. A brake mechanism for railway trucks having a wheel and axle assembly, a frame having side frame members spring-supported through equalizer bars from the wheel and axle assembly, and spring seats rigidly secured to the equalizer bars, a brake ring rotatable with each wheel of said assembly, and a unitary transversely extending brake support carrying brake shoes in cooperative relation with said rings and actuating means for the shoes, the ends of said support being each connected through longitudinally spaced points of support to one of said spring seats, said connections being flexible to permit limited vertical movement or longitudinal tilting of the equalizer bars with respect to each other without appreciably stressing the brake support.

6. A brake mechanism for railway trucks comprising a wheel and axle assembly, a truck frame having side members spring-supported through equalizer bars from the wheel and axle assembly, and spring seating brackets rigidly secured to said equalizer bars, a brake ring rotatable with each wheel of said assembly, and a unitary transversely extending brake support carrying brake shoes in cooperative relation with said rings and actuating means for the shoes, the ends of said support having longitudinal extensions provided with sockets, and the spring seating brackets adjacent said ends being similarly provided with longitudinal extensions carrying horizontal inwardly projecting pins disposed in said sockets, and cushioning means interposed between said pins and their respective sockets.

7. A brake mechanism for railway trucks having a wheel and axle assembly and longitudinal side frame members supported from the opposite ends of said wheel and axle assembly comprising brake rings rotatable one with each wheel of said wheel and axle assembly, and a brake support carrying brake shoes disposed in cooperative relation with said rings and actuating means for said shoes, said brake support extending from side frame member to side frame member and being flexibly supported therefrom on horizontal pivots adjacent said wheel and axle assembly and intermediate its ends at a remote point designed to take the braking torque reactions.

8. A brake mechanism for railway trucks having a wheel and axle assembly and longitudinally extending equalizers supported from the opposite ends of said wheel and axle assembly, comprising brake discs rotatable one with each wheel of said wheel and axle assembly, and a unitary brake supporting structure arranged at one side of the wheel and axle assembly and carrying brake shoes disposed in cooperative relation with said discs and actuating means for the shoes, said brake supporting structure extending from equalizer to equalizer, being carried wholly by said equalizers and connected at its ends to said equalizers through extended flexible joints arranged to take the braking torque and to allow for relative movements of said equalizers without unduly stressing said supporting structure, the shoes being nearer to the axle of said assembly than said joints thereby developing a torque in the supporting structure per se, said joints through and by virtue of their extent preventing the turning of the supporting structure on its axis under said developed torque.

9. In a brake mechanism for railway trucks having a wheel and axle assembly and longitudinally extending equalizers supported from the opposite ends of said wheel and axle assembly, comprising brake discs rotatable one with each wheel of said wheel and axle assembly, and a unitary brake supporting structure arranged at one side of the wheel and axle assembly and carrying brake shoes disposed in cooperative relation with said discs and actuating means for said shoes, said brake supporting structure extending from equalizer to equalizer, being carried wholly by said equalizers and connected to said equalizers through flexible joints, said shoes being nearer to the axle of said assembly than said joints thereby developing a torque in said supporting structure per se, said joints being arranged to wholly counteract the developed braking torque of the supporting structure within the joints themselves and to allow for relative movement of said equalizers without unduly stressing said supporting structure.

CAROLUS L. EKSERGIAN.
PAUL W. GAENSSLE.